(12) United States Patent
Huh et al.

(10) Patent No.: US 10,272,788 B2
(45) Date of Patent: Apr. 30, 2019

(54) HYBRID SYSTEM WITH MULTIPLE ENERGY STORAGE DEVICES

(71) Applicant: General Electric Company, Schenectady, NY (US)

(72) Inventors: Kum-Kang Huh, Niskayuna, NY (US); Di Pan, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 496 days.

(21) Appl. No.: 14/838,485

(22) Filed: Aug. 28, 2015

(65) Prior Publication Data

US 2017/0057363 A1    Mar. 2, 2017

(51) Int. Cl.
*H02J 1/00* (2006.01)
*B60L 11/18* (2006.01)
*B60L 11/00* (2006.01)
*H02M 3/04* (2006.01)
*H02M 7/44* (2006.01)

(52) U.S. Cl.
CPC ............ *B60L 11/18* (2013.01); *B60L 11/005* (2013.01); *H02M 3/04* (2013.01); *H02M 7/44* (2013.01); *B60L 2210/10* (2013.01); *Y02T 10/7022* (2013.01); *Y02T 10/7216* (2013.01)

(58) Field of Classification Search
None
See application file for complete search history.

(56) References Cited

U.S. PATENT DOCUMENTS

| 6,323,608 | B1 | 11/2001 | Ozawa |
| 7,595,597 | B2 | 9/2009 | King et al. |
| 7,990,117 | B2 | 8/2011 | Benedict |
| 8,026,638 | B2 | 9/2011 | King et al. |
| 8,922,057 | B2 | 12/2014 | King et al. |
| 2012/0043923 | A1* | 2/2012 | Ikriannikov ............. H02J 1/10 320/103 |
| 2012/0153729 | A1 | 6/2012 | Song et al. |
| 2012/0194133 | A1 | 8/2012 | Posamentier et al. |
| 2013/0234669 | A1 | 9/2013 | Huang et al. |
| 2014/0077592 | A1 | 3/2014 | Koch et al. |
| 2014/0084817 | A1 | 3/2014 | Bhavaraju et al. |

(Continued)

OTHER PUBLICATIONS

Liu et al., "A ZVS Bi-Directional DC-DC Converter for Multiple Energy Storage Elements," IEEE Transactions on Power Electronics, vol. 21, No. 5, Sep. 2006, pp. 1513-1517.

(Continued)

*Primary Examiner* — Long Nguyen
(74) *Attorney, Agent, or Firm* — Ziolkowski Patent Solutions Group, SC; Jean K. Testa (57) ABSTRACT

A hybrid energy system for providing power to a load and for providing a fast variation of DC link voltage to improve system efficiency is disclosed. The system includes a load, a direct current (DC) link electrically coupled to the load, an energy storage system having a first energy storage device and a second energy storage device arranged in series, and a bi-directional DC-DC converter electrically coupled to the DC link and to the energy storage system, the bi-directional DC-DC converter being connected to a node located between the first energy storage device and the second energy storage device and to a node connecting the second energy storage device to the DC link.

17 Claims, 8 Drawing Sheets

(56) References Cited

U.S. PATENT DOCUMENTS

2014/0265559 A1\* 9/2014 Leehey .................. B60L 1/003
                                                    307/10.1
2016/0149502 A1\* 5/2016 Kidera .............. H02M 3/33584
                                                    363/21.06

OTHER PUBLICATIONS

Liu et al., "Design of Battery and Ultracapacitor Multiple Energy Storage in Hybrid Electric Vehicle," Vehicle Power and Propulsion Conference, Sep. 2009, VPPC '09, IEEE, pp. 1395-1398.
Naaz et al., "Control of Multi Input DC/DC Converter Using Battery and Ultra Capacitor," International Journal of Advances in Engineering & Technology, vol. 3, Issue 2, May 2012, pp. 495-498.
Mohod et al., "DC-DC Converter for Interfacing Energy Storage," American International Journal of Research in Science, Technology, Engineering & Mathematics, 2013, pp. 76-81.
European Search Report and Opinion issued in connection with corresponding EP Application No. 16185846.9 dated Jan. 3, 2017.

\* cited by examiner

HYBRID SYSTEM WITH MULTIPLE ENERGY STORAGE DEVICES

BACKGROUND

The invention relates generally to vehicle drive systems, and more specifically to battery powered drive systems such as those used in battery powered electric vehicles, hybrid electric vehicles, or plug-in hybrid electric vehicles.

Electric vehicles and hybrid electric vehicles are typically powered by one or more energy storage devices, either alone or in combination with an engine (e.g., internal combustion engine, turbine engine, etc.), with such energy storage devices including one or more of batteries, ultracapacitors, flywheels, or a combination of these elements in order to provide sufficient energy to power an electric motor. In pure electric vehicles, the one or more energy storage devices power the entire drive system, thereby eliminating the need for an engine. Hybrid electric vehicles, on the other hand, include energy storage device power to supplement power supplied by an engine, which greatly increases the fuel efficiency of the engine and of the vehicle.

A DC/DC converter is widely used in hybrid and electric vehicle systems as an interface between a battery and the motor drive DC link. It has been proposed previously to use more power dense energy storage like an ultracapacitor in combination with the battery to improve the transient power capability of the drive system, which enables reducing the overall system cost by reducing the power requirement of the battery and the DC/DC converter. However, one drawback of existing arrangements of a battery and ultracapacitor in a vehicle drive system is that the ultracapacitor is always connected to the DC link and the battery. Due to the large capacitance of the ultracapacitor, the voltage of the DC link capacitor cannot be changed in a short time period. Therefore, in comparison to a more common system that does not make use of an ultracapacitor, it is difficult to optimize the system efficiency by reducing the DC link voltage when the load power demand is low.

Therefore, it is desirable to provide an electric and/or hybrid electric propulsion system in which a fast variation of the DC link voltage may be achieved so as to improve system efficiency. It would be further desirable for such DC link voltage to be controllable without affecting the power capability of the system and for the ultra capacitor to provide transient power (both directions), so that the size of the battery and DC/DC converter can be minimized.

BRIEF DESCRIPTION OF THE INVENTION

In accordance with one aspect of the invention, a drive system includes a load, a direct current (DC) link electrically coupled to the load, an energy storage system having a first energy storage device and a second energy storage device arranged in series, and a bi-directional DC-DC converter electrically coupled to the DC link and to the energy storage system, the bi-directional DC-DC converter being connected to a node located between the first energy storage device and the second energy storage device and to a node connecting the second energy storage device to the DC link.

In accordance with another aspect of the invention, an energy system for providing power to a load includes an energy storage system electrically coupleable to the load through a DC link, with the energy storage system further including a first energy storage device and a second energy storage device arranged in series with the first energy storage device, the second energy storage device being coupled directly to the DC link. The energy system also includes a bi-directional DC-DC converter electrically coupled to the DC link and to the energy storage system, with the bi-directional DC-DC converter connecting the first energy storage device to the DC link such that power to and from the first energy storage device is selectively routed through the bi-directional DC-DC converter and with the bi-directional DC-DC converter positioned such that power to and from the second energy storage device bypasses the DC-DC converter.

In accordance with another aspect of the invention, a drive system includes a load, a direct current (DC) link electrically coupled to the load, an energy storage system having a first energy storage device and a second energy storage device, a bi-directional DC-DC converter positioned such that the first energy storage device is connected to the DC link through the bi-directional DC-DC converter and the second energy storage device is coupled directly to the DC link, and a switch positioned between the second energy storage device and the DC link, the switch being operable in a closed position and an open position to selectively connect and disconnect the second energy storage device to and from the DC link, respectively.

In accordance with still another aspect of the invention, a drive system includes a load, a direct current (DC) link electrically coupled to the load, a first energy storage device positioned on a low voltage side of the drive system, a second energy storage device positioned on a high voltage side of the drive system, and a bi-directional DC-DC converter positioned between the low voltage side and the high voltage side to decouple the first energy storage device from the DC link, the bi-directional DC-DC converter boosting voltage from the first energy storage device for providing to the DC link on the high voltage side. The drive system also includes a switch positioned between the second energy storage device and the DC link, the switch being operable in a closed position and an open position to selectively connect and disconnect the second energy storage device to and from the DC link, respectively.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION

An arrangement of a power dense energy storage device and an energy battery is shown that provides improved transient power capability in a hybrid power drive system. A switching device for selectively connecting and disconnecting the power dense energy storage device to the drive system with an energy battery is also shown that allows for fast variation of DC link voltage and improves efficiency of the drive system.

Figure 1:
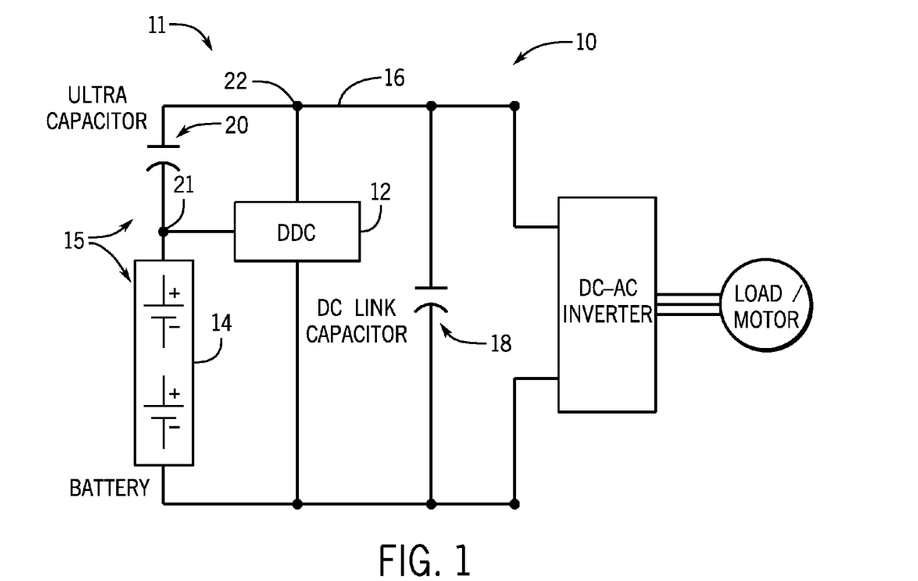
FIG. 1 schematically illustrates a drive system according to an embodiment of the invention.

Referring first to FIG. 1, a drive system 10, such as a vehicle propulsion system, is shown according to an embodiment of the invention, with the drive system 10 having an energy system 11 that includes a DC/DC converter 12 and an energy storage system 15. The energy storage system 15 includes a first energy storage device 14 and a second energy storage device 20. In an exemplary embodiment, the first energy storage device 14 is a high specific energy battery and the second energy storage device 20 is an ultracapacitor—with these energy storage devices being referred to hereafter as battery 14 and ultracapacitor 20. It is recognized, however, that in other embodiments of the invention the energy storage devices could be provided in a different form, such as the second energy storage device 20 being a lithium ion battery or other power dense energy storage device, and such alternate embodiments are recognized as being within the scope of the invention.

In drive system 10, the DC/DC converter 12 connects the battery 14 on a low voltage side of the system to a high voltage DC link 16, with a DC link capacitor 18 optionally being provided on the DC link (dependent on the construction of DC/DC converter 12, for example) to provide filtering. The ultracapacitor 20 is also placed between the battery 14 and the high voltage DC link 16, with a voltage of the ultracapacitor 20 being the difference between a voltage on the DC link 16 and a voltage of the battery 14. The ultracapacitor 20 can be charged and discharged from the DC link 16. The battery 14 is coupled in series with the ultracapacitor 20, such that a combined output power of the battery 14 and the ultracapacitor 20 can be provided to the DC link 16 for transmission to a load 21. As shown in FIG. 1, the DC/DC converter 12 is connected to a node 21 located between the battery 14 and the ultracapacitor 20, such that a voltage output of the battery 14 may be provided to the DC/DC converter 12, without a voltage output of the ultracapacitor 20 needing to be passed through the DC/DC converter 12. The DC/DC converter 12 is further connected to a node 22 connecting the ultracapacitor 20 to the DC link 16 such that, for example, a boosted output of the DC/DC converter 12 may be provided directly to the DC link 16 and combined with an output of the ultracapacitor 20 for providing power to the DC link 16.

While the energy storage system 15 of FIG. 1 is shown with the ultracapacitor 20 being positioned above battery 14 and adjacent to node 22, it is recognized that the arrangement of the ultracapacitor 20 and battery 14 could be reversed. That is, according to another embodiment, the battery 14 could be positioned above the ultracapacitor 20 so as to be adjacent node 22.

Figure 2:
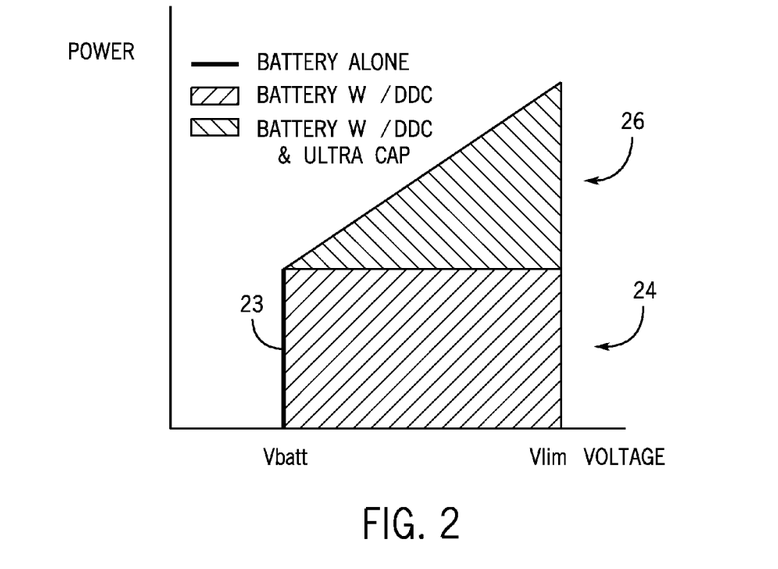
FIG. 2 graphically illustrates a power capability of the drive system of FIG. 1.

The power capability of the drive system 10 provided by the above described arrangement of the DC/DC converter 12, battery 14, and the ultracapacitor 20 with the DC link 16 is illustrated in FIG. 2. As can be seen therein, with the battery alone, the power capability is simplified a single line on the diagram, as indicated at 23. While the battery voltage is assumed to be constant for simplicity, in reality, the battery voltage decreases or increases as the discharge or charge power varies due to the internal impedance of the battery—with the battery voltage and state of charge both changing. By adding a DC/DC converter with sufficient power, the operating space of the system can be extended to cover higher voltage, as indicated at 24. That is, by adding the DC/DC converter, the limit of the system voltage is increased to the voltage limit of the DC/DC converter. Depending on the power capability of the DC/DC converter, the power capability of the battery may not be fully utilized. As shown and described in FIG. 1, an ultracapacitor can be added to improve the power capability of the system, as indicated at 26. Ideally, the power capability of the ultracapacitor is a linear function of its terminal voltage for specified current rating. Due to its large capacitance, the ultracapacitor is able to deliver high power momentarily if pre-charged to the desired voltage level. Typically, the maximum level of charge or discharge current of the ultracapacitor is larger than that of the battery. If the power is delivered only through the series path of the battery and the ultracapacitor, the output power of the ultracapacitor is limited by the maximum current of the battery. In order to deliver higher power in or out of the ultracapacitor, the DC/DC converter can control the current injected into the node between the ultracapacitor and the battery so that current level of the ultracapacitor can be larger than the battery while the battery is charging or discharging within its own maximum current. This way, the DC/DC converter handles only the difference of current between the ultracapacitor and the battery. The same applies for the case where the current capability of the ultracapacitor is lower than the battery.

Figure 3:
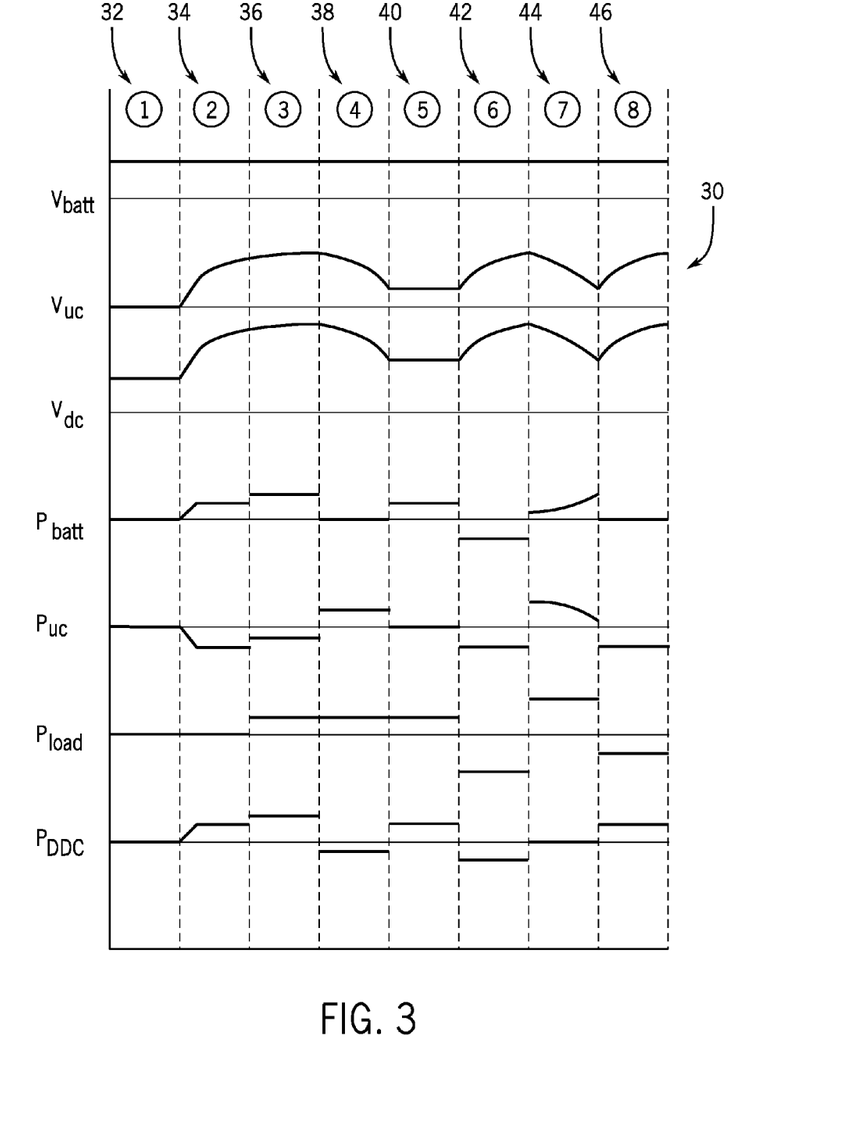
FIG. 3 graphically illustrates various states of operation of the drive system of FIG. 1.

Referring now to FIG. 3, and with reference back to FIG. 1, an exemplary operational cycle 30 of the drive system 10 is shown. As shown at 32, the system 10 is initially in a standby mode, with no power transfer occurring that time. During a period where there is no load demand, as shown at 34, the DC/DC converter 12 raises the DC link voltage and charges the ultracapacitor 20. Initially starting from zero voltage, the power entering the ultracapacitor 20 is limited by the maximum current of the ultracapacitor. The power entering the ultracapacitor 20 can also be limited by the capability of the DC/DC converter 12 or by the charging power command. Next, when the load requires power, as shown at 36, the battery 14 provides the load with power through the DC/DC converter 12 while the ultracapacitor 20 continues charging. As shown at 38, the load power is maintained, with the ultracapacitor 20 then discharging to provide power, the DC/DC converter 12 bypassing the current, and the battery 14 not providing power. At 40, the battery 14 provides all load power through DC/DC converter 12, with the ultracapacitor voltage and DC link voltage remaining constant. When regenerative power feeds both the battery 14 and the ultracapacitor 20, as shown at 42, the ultracapacitor voltage and DC link voltage increase. When the DC/DC converter 12 shuts down, as shown at 44, the battery 14 and ultracapacitor 20 together provide load power. Then, during a period shown at 46, regenerative power feeds only the ultracapacitor 20, while the battery state-of-charge (SOC) remains constant.

While the arrangement of the DC/DC converter 12, battery 14, and the ultracapacitor 20 with the DC link 16 provides an improved transient power capability in the drive system 10, it is recognized that the ultracapacitor 20 is always connected to the DC link 16 and the battery 14 in the drive system 10. An alternative drive system 100 is thus shown in FIG. 4 in which the ultracapacitor may be disconnected from the DC link 16 and the battery 14, so as to allow the DC link voltage to be controlled to vary faster according to the need for better efficiency.

Figure 4:
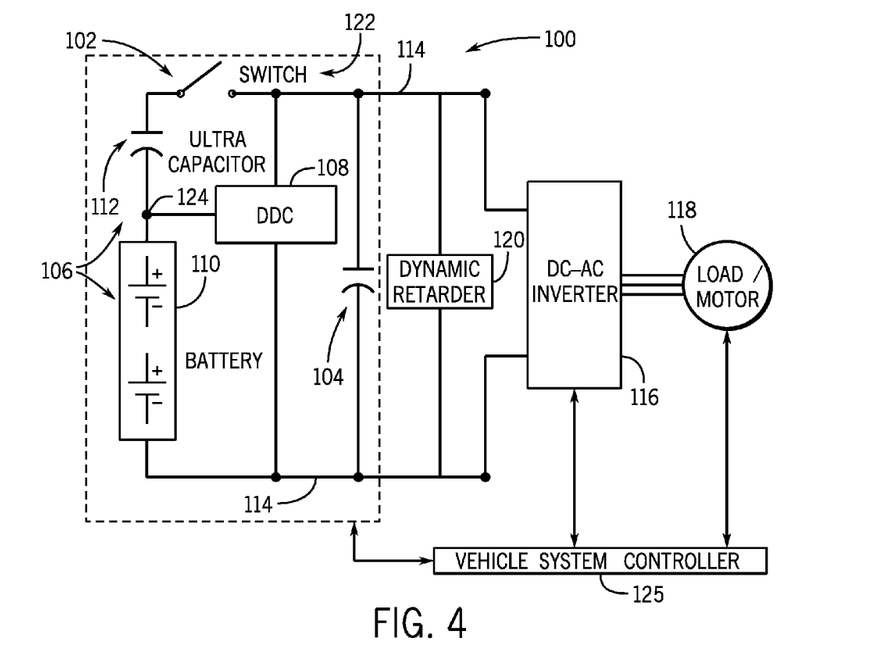
FIG. 4 schematically illustrates a drive system according to another embodiment of the invention.

As shown in FIG. 4, the drive system 100 includes an energy system 102 comprised of an energy storage system 106 and a bi-directional boost converter 108—with the energy storage system 106 including a battery 110 (e.g., high specific energy battery) and an ultracapacitor 112. However, as mentioned above with respect to FIG. 1, it is recognized that in other embodiments of the invention, other suitable energy storage devices could be substituted for the battery 110 and ultracapacitor 112, such as the ultracapacitor being replaced by a high power lithium ion battery, for example. The energy storage system 106 is coupled via a direct current (DC) link 114 to a DC-AC inverter 116 and a load 118 that is preferably an electric drive, such as an AC motor, but is not limited as such. In one embodiment, a DC link capacitor 104 is provided on the DC link 114 to provide filtering to power thereon, but it is recognized that in some embodiments the DC link capacitor is not required.

The bi-directional boost converter 108 is operable to boost voltage received from the high specific-energy battery 110 and ultracapacitor 112 to the DC link 114 and/or buck voltage from the DC link 114 to the high specific-energy battery 110 and ultracapacitor 112. In the boost mode of operation, the combination of high specific-energy battery 108 and ultracapacitor 110 transfers electrical energy to bi-directional boost converter 108, which in turn provides boosted voltage to DC link 114. That is, voltage provided on the low voltage side of energy system 102 (by battery 110) is boosted by bi-directional boost converter 108 such that the voltage provided to DC link 114 on the high voltage side of energy system 102 is increased. The electrical energy provided via bi-directional boost converter 108 is dynamically controlled and is dependent upon the charge capacity and requirements of the battery 110 and/or ultracapacitor 112.

Also coupled to DC link 114 is a dynamic retarder 120. Dynamic retarder 120 acts to limit the DC voltage developed on DC link 114 when electric drive 118 is operated in a regenerative mode, wherein electric energy is returned to DC link 114 through DC-AC inverter 116 during a regenerative braking event. Additionally, when electric drive 118 operates in a regenerative braking mode, drive system 100 is configured to deliver the regenerative electrical energy through multi-channel bi-directional boost converter 108 via DC link 114, wherein the electrical energy is then recaptured and stored in at least one of the battery 110 and ultracapacitor 112. Conventionally, in a system with only a high specific-energy battery 110 coupled through a bi-directional boost converter 108, a significant portion of the regenerative energy would have to be captured in the high specific-energy battery 110 through increased current. Thus, high losses would be experienced both in the high specific-energy battery's internal resistance and also in the bi-directional boost converter 108 due to a limit in the amount of charge acceptance and voltage limits of the battery 110. However, under the configuration shown in FIG. 4, the losses in both the bi-directional boost converter 108 and high specific-energy battery 110 are greatly reduced. That is, the configuration of ultracapacitor 112 and high specific-energy battery 110 enables much of the regenerated energy to be captured in ultracapacitor 112, rather than relying upon only high specific-energy battery 110 to capture regenerated energy. Unlike high specific-energy battery 110, ultracapacitor 112 is operable at a low state-of-charge (SOC) and is capable of rapid high-rate electrical charge acceptance. As such, ultracapacitor 112 is capable of accepting much of the regenerative power from the high voltage regenerated energy generated by electric drive 118 during vehicle deceleration, resulting in lower electrical loss and thermal cycling stresses within bi-directional boost converter 108 and high specific-energy battery 110, which thereby improves the overall efficiency of drive system 100.

While the inclusion of ultracapacitor 112 aids to reduce losses experienced in both the bi-directional boost converter 108 and high specific-energy battery 110 (as compared to a system that does not include an ultracapacitor), it is recognized that—due to the large capacitance of the ultracapacitor 112—the voltage of the DC link 114 cannot be changed in a short time period. That is, if the ultracapacitor 112 is always connected to the DC link 114 and the battery 110, the voltage of the DC link 114 cannot be changed in a short time period. Accordingly, in order to optimize the drive system efficiency by reducing the DC link voltage when the load power demand is low, a switch 122 is provided in the energy system 102 that is positioned between the ultracapacitor 112 and the high voltage DC link 114, as shown in FIG. 4. The switch 122 is operable to selectively connect and disconnect the ultracapacitor 112 to/from the DC link 114—with the switch 122 thus being able to selectively disconnect the ultracapacitor 112 so as to allow the DC link voltage to be varied faster and with better efficiency. While switch 122 is shown in FIG. 4 as a simple, contactor-type mechanical switch, it is recognized that any suitable switch could be used—with the switch 122 controlling the flow of current therethrough in one or both directions, as will be explained in greater detail with regard to additional embodiments of the invention.

In operation of the drive system 100, the actuation of the switch 122 between open and closed positions is controlled based on power requirements of the electric drive 118 as well as power and voltage requirements/levels of the battery 110 and ultracapacitor 112 of the energy storage system 106. In selectively utilizing the ultracapacitor 112 via actuation of switch 122, and to enable the ultracapacitor 112 to have the capability to provide and absorb power, its voltage is controlled at a nominal value $V_{nom}$. As defined herein the nominal voltage $V_{nom}$ for ultracapacitor 112 is a voltage value between a lowest operating voltage of the ultracapacitor, V1, and a maximum voltage of the ultracapacitor, V4. The nominal voltage $V_{nom}$ is further defined as being between a demand charge threshold of the ultracapacitor, V2, that depends on the minimum amount of stored energy desired for providing transient power and a demand discharge threshold of the ultracapacitor, V3, that corresponds to the highest stored energy to allow desired energy absorbing. In operation of the drive system 100, when the ultracapacitor voltage is higher than V3, the drive system will operate to discharge the ultracapacitor such that its voltage is reduced from V3 to $V_{nom}$ whenever possible. Similarly, when the ultracapacitor voltage is lower than V2, the drive system will operate to charge the ultracapacitor such that its voltage is increased from V2 to $V_{nom}$ when possible.

As shown in FIG. 4, a vehicle system controller 125 is included in drive system 100 and is in operative communication with the energy system 102 (including DC-DC converter 108, battery 110, ultracapacitor 112 and switch 122), inverter 116 and electric drive 118 to receive inputs therefrom and control operation thereof. The controller 125 operates to control operation of components of the energy system 102 based on power requirements of the electric drive 118 and based on voltage levels of the battery 110 and ultracapacitor 112. More specifically, controller 125 controls operation of DC-DC converter 108 (to boost/buck voltage), controls actuation of switch 122 between open and closed positions, and controls charging and discharging of the battery 110 and ultracapacitor 112 based on power requirements of the electric drive 118 and based on voltage levels of the battery 110 and ultracapacitor 112.

While the energy storage system 106 of FIG. 4 is shown with the ultracapacitor 112 being positioned above battery 110 and adjacent to switch 122, it is recognized that the arrangement of the ultracapacitor 112, battery 110, and switch 122 could be reversed. That is, according to another embodiment, the battery 110 could be positioned above the ultracapacitor 112 (with battery 110 above node 124 and ultracapacitor 112 below node 124), with the position of the switch 122 being moved such that it remains adjacent ultracapacitor 112 to control connection thereof to DC link 114.

Figure 5:
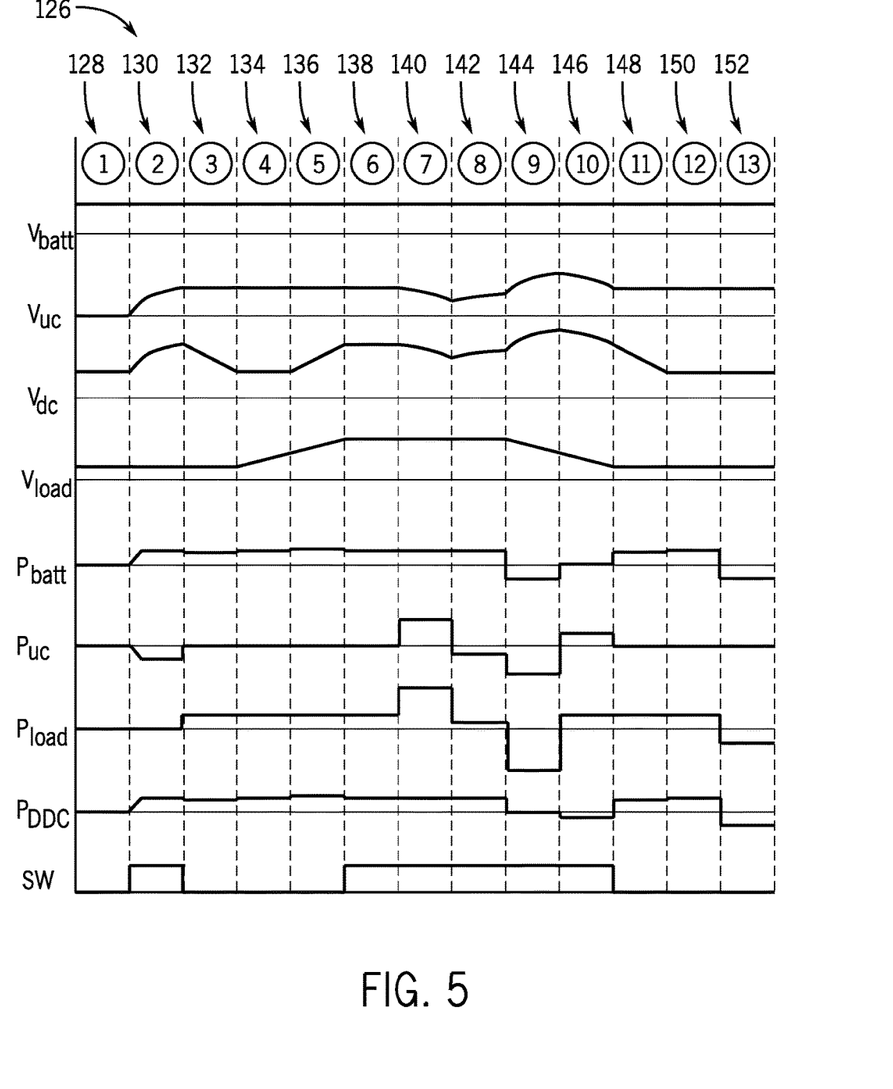
FIG. 5 graphically illustrates various states of operation of the drive system of FIG. 4.

Referring now to FIG. 5, and with continued reference to FIG. 4, an exemplary operational cycle 126 of the drive system 100 is shown (such as could be controlled by vehicle system controller 125), in order to better illustrate and describe the operation thereof. The operational cycle 126 begins with the system 100 being initially in a standby mode, as indicated at 128, with no power transfer occurring that time. Switch 122 is open during the standby mode. After standby but during a period where there is no load demand, as shown at 130, the switch 122 is closed, with the bi-directional boost converter 108 raising the DC link voltage to charge the ultracapacitor 112 to the nominal voltage, $V_{nom}$. During a period where a load power requirement is introduced that does not exceed the power available in battery 110, as indicated at 132, the switch 122 is opened such that the ultracapacitor voltage remains at the nominal value. During this period, the bi-directional boost converter 108 reduces the DC link voltage while the battery 110 provides the load power, which reduces the switching loss of a motor drive converter 116 that is attached to the DC link 114. The positioning of switch 122 remains the same (i.e., open) during a next period 134 where the load voltage requirement increases but is still lower than the battery voltage, the battery 110 continues to provide the load power.

In a next step of the operational cycle 126, and as indicated at 136, the load voltage requirement increases to a level higher than the battery voltage. During this period, the bi-directional boost converter 108 functions to boost voltage provided by the battery 110 and raise the DC link voltage to meet the voltage requirement—with the switch 122 still remaining open. During a next period 138, the DC link voltage reaches a nominal value—with the battery 110 continuing to provide all the load power and the bi-directional boost converter 108 continuing to boost voltage provided by the battery 110. Also during the period 138, the switch 122 is closed so as to connect the ultracapacitor 112 to the DC link 114. As the ultracapacitor 112 is connected to the DC link 114, a large transient load imposed by the electric drive 118 during a period 140 can be handled by a combination of the battery 110 and ultracapacitor 112—with the ultracapacitor 112 discharging power to supplement power provided by the battery 110 in order to collectively provide increased power to meet this load. Also during the period 140, the DC link voltage is decreased due to the discharge of the ultracapacitor 112.

As indicated at 142, during a period of the operational cycle 126 when the load imposed by the electric drive 118 is decreased (and after discharging of the ultracapacitor 112), the battery 110 functions to provide load power as well as power to charge the ultracapacitor 112 to its nominal voltage. More specifically, if the ultracapacitor 112 is at a voltage that is approaching its demand charge threshold, V2, recharging of the ultracapacitor 112 is performed via power from the battery 110. At a period 144 when there is a large regenerative transient power present in the drive system 100, such as might occur during regenerative braking of a motor drive for example, the DC link voltage will be above the nominal value, and thus recharging power is provided to both the battery 110 and the ultracapacitor 112. At a conclusion of the period 144, ultracapacitor 112 is recharged to a high voltage, such as a voltage at the demand discharge threshold, V3, or approaching the maximum voltage, V4. Thus, in a next period 146 where a load power requirement is again introduced by electric drive 118 with a small load voltage requirement, the ultracapacitor 112 discharges to provide load power as well as provide a small power to charge the battery 110. Also during this period 146, the DC link voltage decreases to nominal value.

In each of periods 138, 140, 142, 144, 146, the switch 122 is in a closed position such that the ultracapacitor 112 is connected to the DC link 114. But upon reaching a time where the DC link voltage has decreased to a nominal value and the load power demand is lower than the capability of the battery 110, a period 148 is initiated by opening the switch 122 in order to disconnect the ultracapacitor 112 from the DC link 114. During period 148, the bi-directional boost converter 108 reduces the DC link voltage to the battery voltage, such that only the battery 110 provides load power. At the same time, the switching loss of the motor drive converter 116 can be reduced because of the reduced DC bus voltage. During a subsequent period 150 where the DC link voltage remains at the battery voltage, the battery 110 continues to provide the load power, and the operational cycle 126 then concludes at period 152 where a regenerative power is again present. In period 152, the switch 122 remains open, with the DC link voltage being equal to the battery voltage and regenerative power from the electric drive 118 feeding the battery 110 at low voltage.

Figure 6:
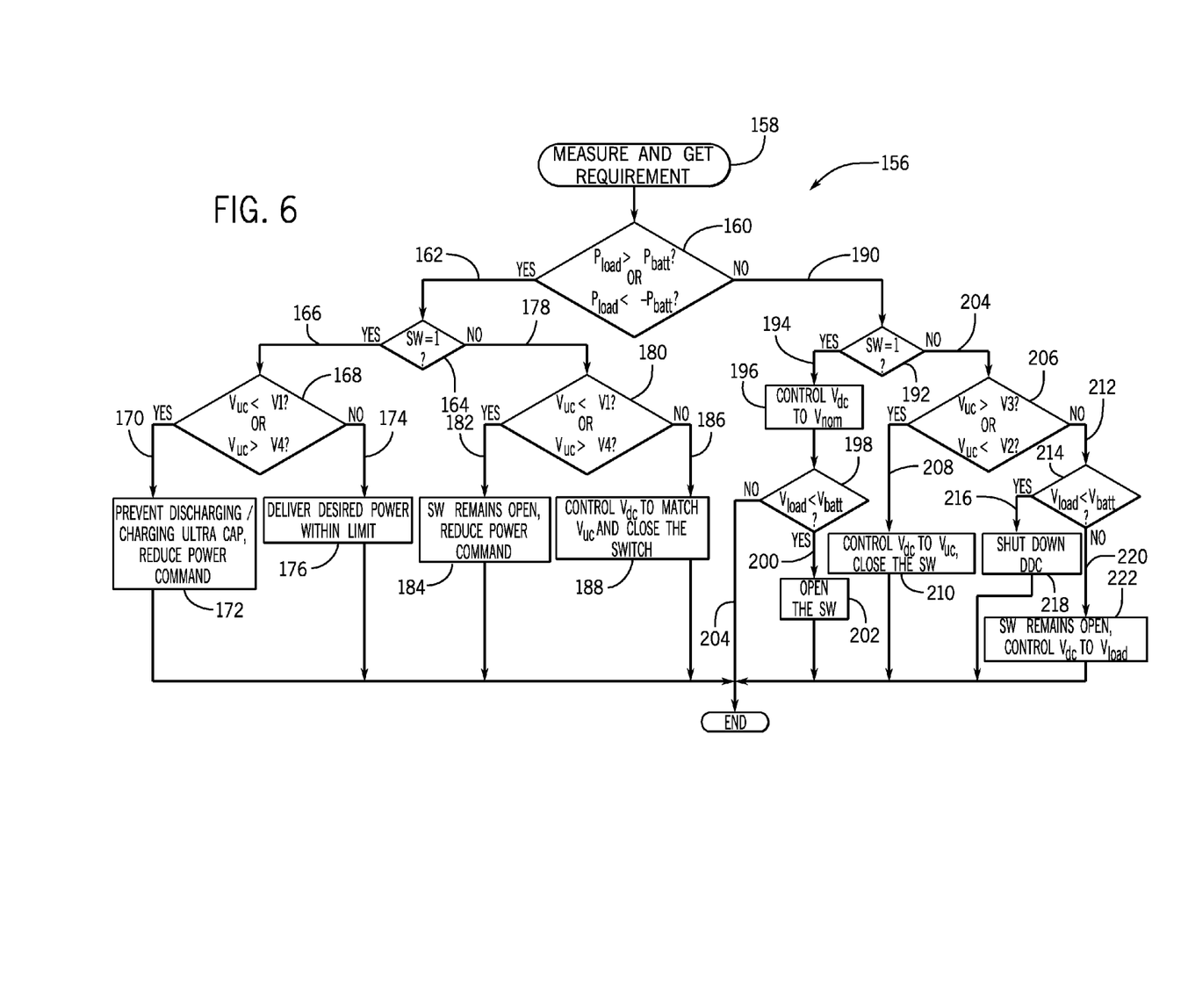
FIG. 6 is a flow chart illustrating a method of operating the drive system of FIG. 4 according to an embodiment of the invention.

Referring now to FIG. 6, and with continued reference back to FIG. 4, a technique 156 for operating the energy system 102 in drive system 100 is described, with it being recognized that the technique 156 could be implemented by vehicle system controller 125, for example. At an initiation of technique 156, a load requirement of the system load (i.e., electric drive 118) is first measured or otherwise determined at STEP 158. The load power requirement is then compared to a power capability of the battery 110 at STEP 160, with a determination being made as to whether a command or requirement for load power is greater than a power capability of the battery ($P_{load} > P_{batt}$) or whether a power of the battery is such that it is capable of receiving power being generated by the load ($P_{load} < P_{-batt}$), such as during regenerative braking power.

If it is determined at STEP 160 either that the load power requirement is greater than a power of the battery or that the load can provide regenerative power to the battery, as indicated at 162, then the technique continues to STEP 164—where a determination is made as to whether the switch 122 is presently in a closed position (i.e., SW=1). If it is determined at STEP 164 that the switch is closed, as indicated at 166, then the technique continues to STEP 168 with a determination of whether a voltage of the ultracapacitor 112 is less than a lowest operating voltage of the ultracapacitor, V1, or whether a voltage of the ultracapacitor 112 is greater than a maximum voltage of the ultracapacitor, V4. If it is determined at STEP 168 that a voltage of the ultracapacitor 112 is less than V1 or greater than V4, as indicated at 170, then the technique continues to STEP 172—where a charging or discharging of the ultracapacitor 112 is prevented. Also at STEP 172, the power command for providing power to the electric drive 118 is reduced.

If instead it is determined at STEP 168 that a voltage of the ultracapacitor 112 is between the voltages V1 and V4 (i.e., is not less than V1 or is not greater than V4), as indicated at 174, then the technique continues to STEP 176—where power is delivered to or received from the electric drive 118 from battery 110 and from ultracapacitor 112, within prescribed limits of the ultracapacitor 112. That is, at STEP 176, power is delivered to or received from the electric drive 118 by the ultracapacitor 112 and battery 110 as long as the voltage of the ultracapacitor 112 remains above the demand charge threshold of the ultracapacitor, V2.

Referring back now to STEP 164, if it is determined at STEP 164 that the switch 122 is open, as indicated at 178, then the technique continues at STEP 180 with a determination of whether a voltage of the ultracapacitor 112 is less than the lowest operating voltage of the ultracapacitor, V1, or whether a voltage of the ultracapacitor 112 is greater than the maximum voltage of the ultracapacitor, V4. If it is determined at STEP 180 that a voltage of the ultracapacitor 112 is less than V1 or greater than V4, as indicated at 182, then the technique continues to STEP 184—where the switch 122 is left open and a power command for the load is reduced, so as to bring the power command below a power available from the battery 110.

If instead it is determined at STEP 180 that a voltage of the ultracapacitor 112 is between the voltages V1 and V4 (i.e., is not less than V1 or is not greater than V4), as indicated at 186, then the technique continues to STEP 188—where the DC link voltage is controlled to a level where it matches the sum of voltage of battery 110 and ultracapacitor 112, then the switch 122 is closed. After the switch 122 is closed, the power can be provided or absorbed by a combination of the battery 110 and the ultracapacitor 112. The ultracapacitor 112 is thus ready to be charged or discharged.

Referring back now to STEP 160, if it is determined at STEP 160 either that the load power requirement is less than a power of the battery or that the load can provide regenerative power to the battery, as indicated at 162, as indicated at 190, then the technique continues to STEP 192—where a determination is made as to whether the switch 122 is presently in a closed position (i.e., SW=1). If it is determined at STEP 192 that the switch is closed, as indicated at 194, then the technique continues to STEP 196, where the DC link voltage is controlled/modified to a nominal DC link voltage value, $V_{DCnom}$, that is equivalent to a sum of the nominal battery voltage, $V_{battnom}$, and the nominal ultracapacitor voltage, $V_{nom}$. Upon modifying the DC link voltage to a nominal DC link voltage value, $V_{Dcnom}$, the technique continues to STEP 198, where a determination is made as to whether the voltage requirement of the load 118 is less than the voltage of battery 110. If it is determined at STEP 198 that the voltage requirement of the load 118 is less than the voltage of battery 110, as indicated at 200, then the technique continues to STEP 202, where the switch 122 is opened so as to disconnect the ultracapacitor from the DC link 114.

Referring back to STEP 192, if it is determined at STEP 192 that the switch 122 is open, as indicated at 204, then the technique continues at STEP 206 with a determination of whether a voltage of the ultracapacitor 112 is greater than the demand discharge voltage threshold, V3, or less than the demand charge voltage threshold of, V2 of the ultracapacitor 112 (i.e., whether the voltage of the ultracapacitor is between V2 and V3). If it is determined at STEP 206 that a voltage of the ultracapacitor 112 is not between the voltage thresholds V2 and V3 (i.e., is greater than V3 or less than V2), as indicated at 208, then the technique continues to STEP 210—where the switch 122 is closed and the energy system 102 is controlled to so as to modify the DC link voltage to a level where it matches the voltage of the ultracapacitor 112.

If it is determined at STEP 206 that a voltage of the ultracapacitor 112 is between the voltage thresholds V2 and V3, as indicated at 212, then the technique continues at STEP 214 with a determination of whether a voltage requirement of the electric drive 118 is less than the voltage of the battery 110. If it is determined at STEP 214 that a voltage requirement of the electric drive 118 is less than the voltage of the battery 110, as indicated at 216, then the bi-directional boost converter 108 is shut down, as routing of voltage through the bi-directional boost converter 108 is not required to meet the voltage requirement of the electric drive 118. Conversely, if it is determined at STEP 214 that a voltage requirement of the electric drive 118 is greater than the voltage of the battery 110, as indicated at 220, then the DC link voltage is controlled/modified so as to meet the voltage demand of the electric drive 118, with the bi-directional boost converter 108 modifying (i.e., boosting) a voltage output by battery 110 before providing the voltage to the DC bus. While controlling the DC link voltage at STEP 222, the switch 122 is left open—such that the ultracapacitor 112 remains disconnected from the DC link 114, thereby allowing the DC link voltage to be varied faster than if the ultracapacitor 112 was connected to the DC link.

In performing technique 156, the bi-directional boost converter 108 is operated so as to keep the ultracapacitor voltage at the nominal value, $V_{nom}$, whenever possible. By maintaining the ultracapacitor at the nominal voltage, $V_{nom}$, the ultracapacitor is available to either provide or absorb energy at any given time. In addition, whenever the load does not require voltage higher than the nominal DC link voltage ($V_{battnom}+V_{nom}$), the ultracapacitor is disconnected from the DC link so that the system efficiency can be optimized.

Figure 7:
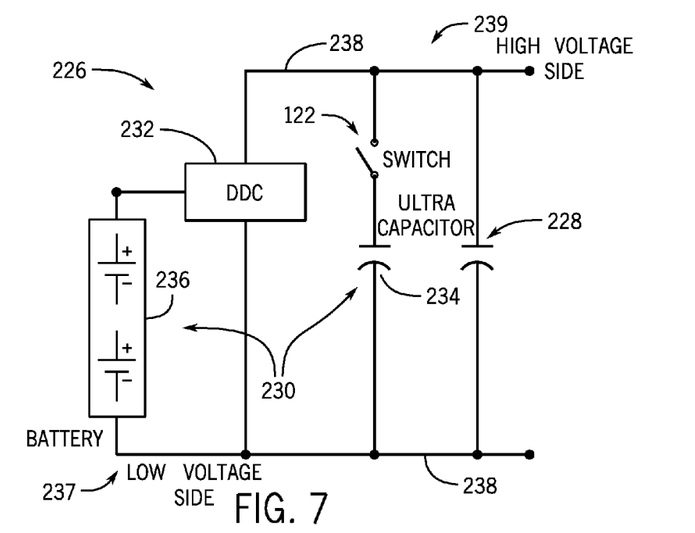
FIG. 7 schematically illustrates a drive system according to another embodiment of the invention.

Referring now to FIG. 7, it is recognized that a switch 122 may be utilized with an arrangement of energy storage devices that differs from those in the drive system 100 of FIG. 4. In FIG. 7, an energy system 226 for use in a drive system is shown according to another embodiment of the invention. The energy system 226 is comprised of an energy storage system 230 and a bi-directional boost converter 232 with the energy storage system 230 including a battery 234 and an ultracapacitor 236. As shown in FIG. 7, the battery 234 is positioned on a low voltage side 237 of the energy system 226 and the ultracapcitor 234 is positioned on a high voltage side 239 of the energy system 226, with the ultracapacitor 234 being selectively connected to a DC link 238 by way of switch 122. The switch 122 allows for the ultracapacitor 234 to be selectively connected and disconnected from the DC link 238 so as to allow the DC link voltage to be controlled to vary faster according to the need for better efficiency. In operation, switching of switch 122 can be performed as set forth in detail in the technique 156 of FIG. 6.

Figure 8:
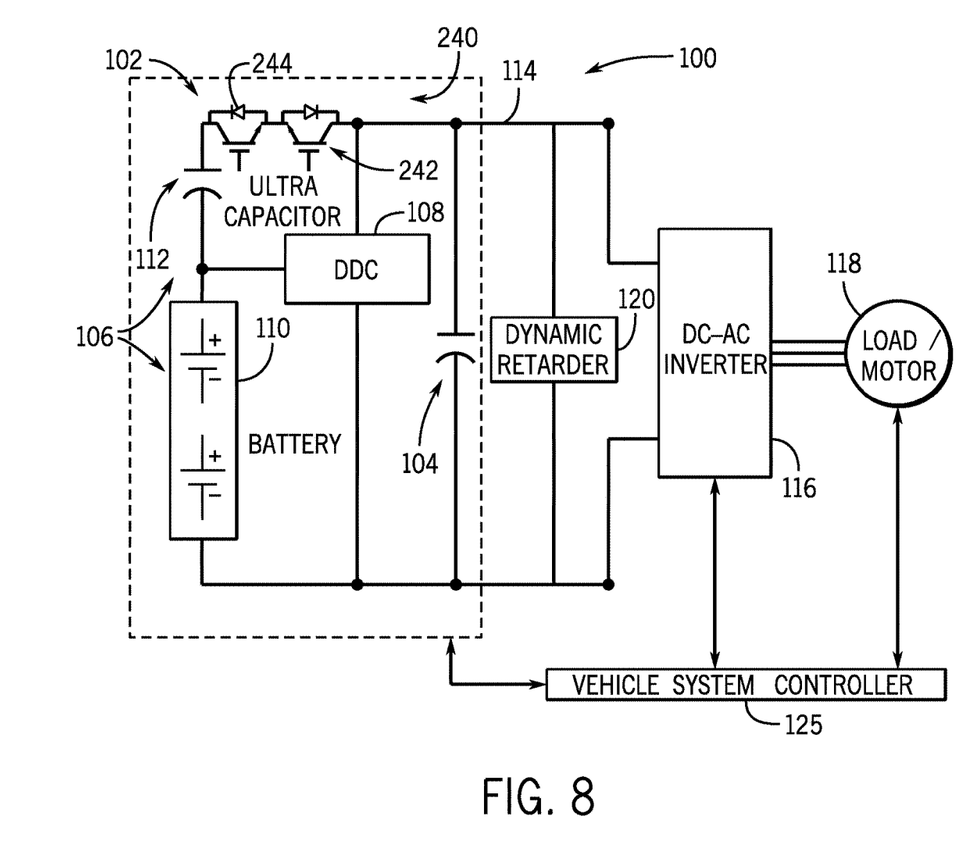
FIG. 8 schematically illustrates a drive system according incorporating an electrical switch to control power flow according to another embodiment of the invention.
Figure 9:
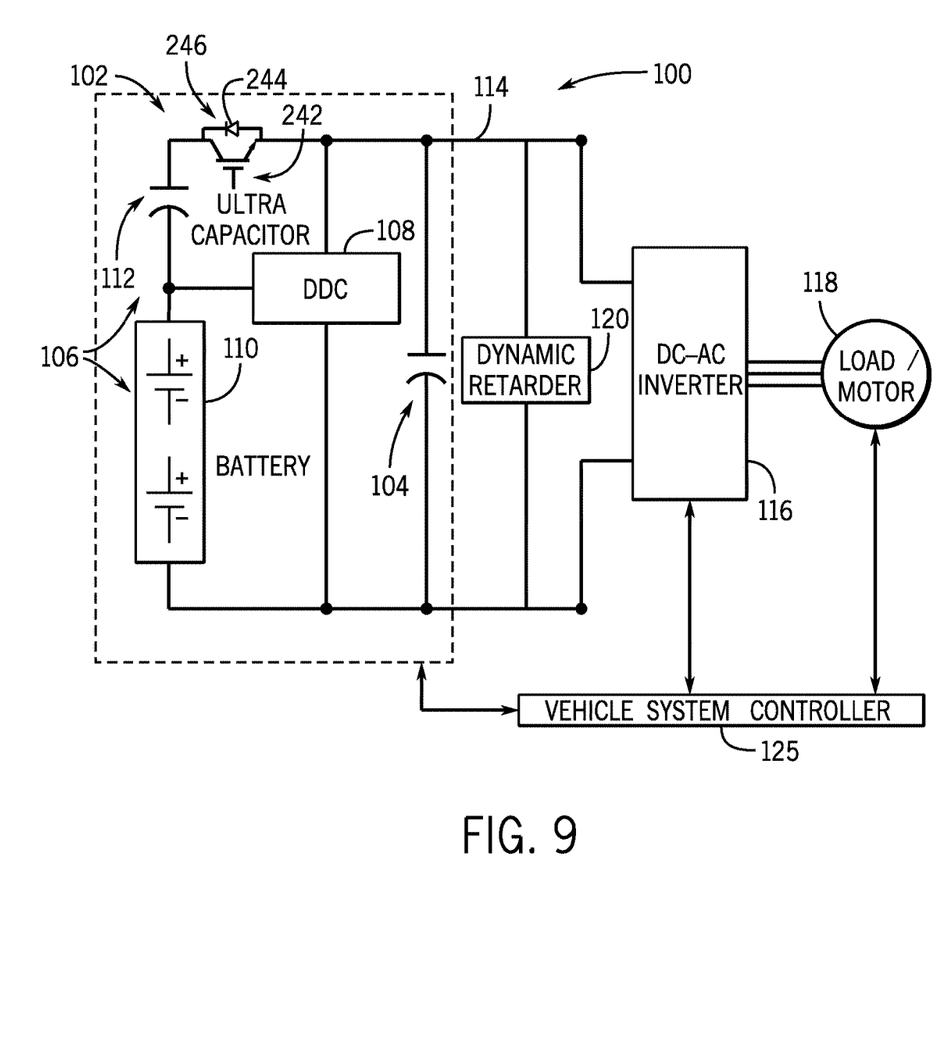
FIG. 9 schematically illustrates a drive system according incorporating an electrical switch to control power flow according to another embodiment of the invention FIG. 10 schematically illustrates a drive system according incorporating an electrical switch to control power flow according to another embodiment of the invention.
Figure 10:
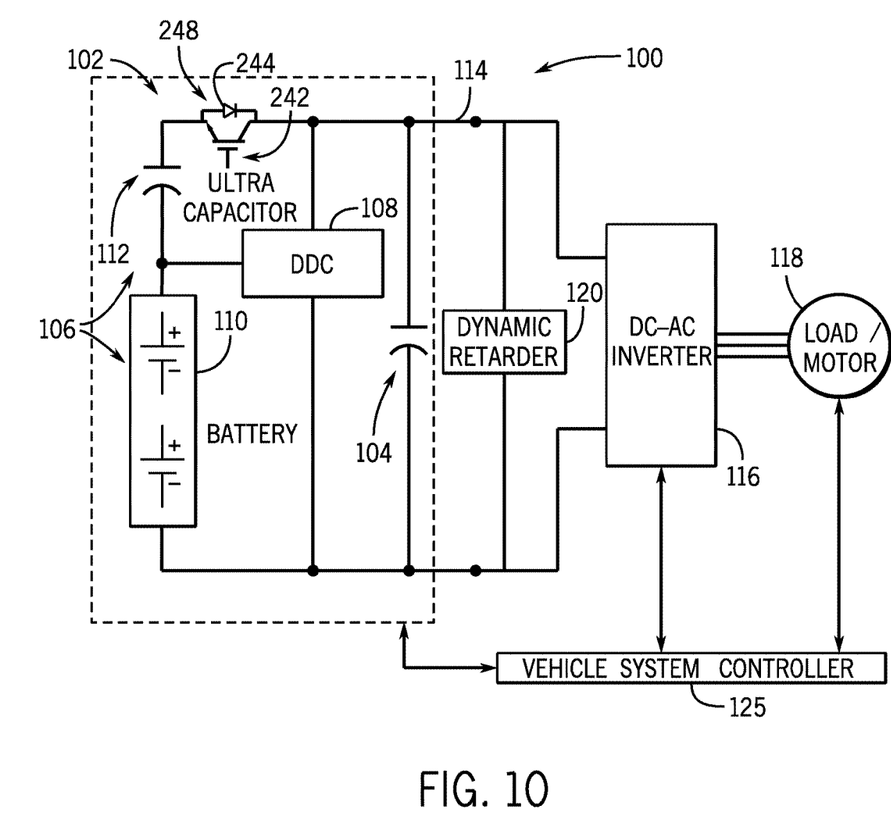

While the energy systems 100, 226 illustrated in FIGS. 4 and 7 are shown as including a switch therein in the form of a mechanical switch or contact movable between open and closed positions, it is recognized that the energy systems 100, 226 can utilize any type of switch—i.e., mechanical switches or electronic switches. Referring now to FIGS. 8-10, examples of different switching devices that might be utilized in an energy system are shown according to embodiments of the invention. The type of switching device provided in the energy system can be selected based on the need/desire for the switching device to block and conduct in a single direction or in both directions.

Referring first to FIG. 8, a switching device 240 is illustrated that is controllable to block and conduct current in both directions—with the switching device 240 in the form of an arrangement of a pair of switches each including a single IGBT 242 with anti-paralleled diode 244. The voltage of the DC link 114 and the ultracapacitor 112 can be fully decoupled. The feasible operating DC link voltage is between the battery voltage and the maximum DC link voltage. This configuration enables full capability of converter efficiency optimization during partial load condition. The ultracapacitor maximum voltage can be selected to be equal or lower than the difference between the maximum DC link voltage and the battery voltage. To be able to deliver or receive high transient power, the DC link 114 has to be connected to the ultracapacitor 112. Therefore, the operating DC link voltage for delivering high transient power is the battery voltage plus the ultracapacitor voltage. The partition of load can be freely controlled by the DC/DC converter 108. Any combination of charge and discharge is allowed to optimize the overall performance of drive system 100 and energy system 102, including power capability and system efficiency. At partial load condition, the DC link voltage is controlled to optimize the system efficiency. During partial load operation, all the load power is delivered or received by the battery 110.

Referring next to FIGS. 9 and 10, switching devices 246, 248 in the form of a single IGBT 242 with anti-paralleled diode 244 are provided—with the diodes in opposing directions in the switching device 246 and the switching device 248. The switching devices 246, 248 can only block voltage in one direction based on the direction of the diode 244 therein. For switching device 246 of FIG. 9, the DC link 114 will automatically charge the ultracapacitor 112 when the DC link voltage is higher than the sum of battery and ultracapacitor voltage. Because the DC link capacitance is much smaller than that of the ultracapacitor 112, the DC link voltage can be changed quickly. However, the ultracapacitor 112 requires more much energy and time to charge or discharge to reach desired voltage. That is, the DC link voltage can only be lower than the sum of battery and ultracapacitor voltage, and the maximum DC link voltage is the sum of the battery voltage and the maximum voltage of the ultra-capacitor. With switching device 246, the discharge of the ultracapacitor 112 can be freely controlled. Switching device 246 thus provides a lower cost alternative to switching device 240 (FIG. 8), while still providing a reduction of switching losses by reducing the DC link voltage. Similar to switching device 240, switching device 246 allows for high power transient power to be delivered or received by the ultra-capacitor 112 and battery 110, and partial load to be delivered only by the battery 110.

In FIG. 10, the switching device 248 automatically discharges the ultracapacitor 112 whenever the DC link voltage is lower than the sum of battery and ultra-capacitor voltage. The DC link voltage can be controlled to between sum of battery and ultra-capacitor voltage and the maximum DC link voltage. Like in switching device 240, the ultracapacitor maximum voltage can be selected to be equal or lower than the difference between the maximum DC link voltage and the battery voltage. Thus, with switching device 248, the DC link voltage is raised to reduce the load current. Systems whose efficiency will benefit from reduced current can utilized switching device 248, with reduced cost compared to switching device 240 (FIG. 8). As with switching device 240, switching device 248 allows for high power transient power to be delivered or received by the ultracapacitor 112 and battery 110, and partial load is only delivered by the battery 110.

Beneficially, embodiments of the invention thus provide an arrangement of a DC/DC converter, battery, and ultracapacitor, with the ultracapacitor allowing for an improved transient power capability in a drive system so that the size of the battery and DC/DC converter can be minimized. A mechanical or electrical switch may be implemented to selectively couple and decouple the ultracapacitor from the DC link in order to enable efficiency improvement compared to a system without a switch for the ultracapacitor. Such a can be selected based on the need/desire for the switching device to block and conduct in a single direction or in both directions.

Therefore, according to one embodiment of the invention, a drive system includes a load, a direct current (DC) link electrically coupled to the load, an energy storage system having a first energy storage device and a second energy storage device arranged in series, and a bi-directional DC-DC converter electrically coupled to the DC link and to the energy storage system, the bi-directional DC-DC converter being connected to a node located between the first energy storage device and the second energy storage device and to a node connecting the second energy storage device to the DC link.

According to another embodiment of the invention, an energy system for providing power to a load includes an energy storage system electrically coupleable to the load through a DC link, with the energy storage system further including a first energy storage device and a second energy storage device arranged in series with the first energy storage device, the second energy storage device being coupled directly to the DC link. The energy system also includes a bi-directional DC-DC converter electrically coupled to the DC link and to the energy storage system, with the bi-directional DC-DC converter connecting the first energy storage device to the DC link such that power to and from the first energy storage device is selectively routed through the bi-directional DC-DC converter and with the bi-directional DC-DC converter positioned such that power to and from the second energy storage device bypasses the DC-DC converter.

According to yet another embodiment of the invention, a drive system includes a load, a direct current (DC) link electrically coupled to the load, an energy storage system having a first energy storage device and a second energy storage device, a bi-directional DC-DC converter positioned such that the first energy storage device is connected to the DC link through the bi-directional DC-DC converter and the second energy storage device is coupled directly to the DC link, and a switch positioned between the second energy storage device and the DC link, the switch being operable in a closed position and an open position to selectively connect and disconnect the second energy storage device to and from the DC link, respectively.

According to still another embodiment of the invention, a drive system includes a load, a direct current (DC) link electrically coupled to the load, a first energy storage device positioned on a low voltage side of the drive system, a second energy storage device positioned on a high voltage side of the drive system, and a bi-directional DC-DC converter positioned between the low voltage side and the high voltage side to decouple the first energy storage device from the DC link, the bi-directional DC-DC converter boosting voltage from the first energy storage device for providing to the DC link on the high voltage side. The drive system also includes a switch positioned between the second energy storage device and the DC link, the switch being operable in a closed position and an open position to selectively connect and disconnect the second energy storage device to and from the DC link, respectively.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A drive system comprising:
   a load;
   a direct current (DC) link electrically coupled to the load;
   an energy storage system comprising a first energy storage device and a second energy storage device, wherein the first energy storage device and the second energy storage device are arranged in series;
   a bi-directional DC-DC converter electrically coupled to the DC link and to the energy storage system, the bi-directional DC-DC converter being connected to a node located between the first energy storage device and the second energy storage device and to a node connecting the second energy storage device to the DC link;
   a switch positioned between the second energy storage device and the DC link, the switch being operable in a closed position and an open position to selectively connect and disconnect the second energy storage device to and from the DC link, respectively; and
   a controller configured to control operation of the bi-directional DC-DC converter and the switch based on power requirements of the load and based on voltage levels of the first and second energy storage devices.

2. The drive system of claim 1 wherein the second energy storage device comprises an ultracapacitor; and
   wherein the controller is configured to control a charging and discharging of the ultracapacitor to maintain the ultracapacitor at a nominal voltage level, the nominal voltage level comprising a voltage level between a demand charge threshold of the ultracapacitor comprising a minimum amount of stored energy for providing transient power from the ultracapacitor and a demand discharge threshold of the ultracapacitor comprising a highest stored energy of the ultracapacitor that allows for energy absorbing.

3. The drive system of claim 2 wherein the controller is configured to:
   cause the ultracapacitor to discharge when a voltage thereof is higher than the demand discharge threshold, so as to bring the voltage of the ultracapacitor down to the nominal voltage level; and
   cause the ultracapacitor to be charged when a voltage thereof is lower than the demand charge threshold, so as to bring the voltage of the ultracapacitor up to the nominal voltage level.

4. The drive system of claim 3 wherein the controller controls operation of the bi-directional DC-DC converter and actuation of the switch between the closed position and the open position to maintain the ultracapacitor at the nominal voltage level.

5. The drive system of claim 2 wherein the controller is configured to:
   determine a load voltage requirement of the load;
   compare the load voltage requirement to a nominal DC link voltage value, the nominal DC link voltage value equivalent to a sum of the ultracapacitor nominal voltage level and a nominal voltage value of the first energy storage device;
   cause the switch to operate in the open position if the load voltage requirement is less than the nominal DC link voltage value; and
   cause the switch to operate in the closed position if the load voltage requirement is greater than the nominal DC link voltage value.

6. The drive system of claim 5 wherein, when the voltage of the ultracapacitor is higher than the demand discharge threshold, the controller causes the ultracapacitor to discharge to provide at least one of a load power and a first energy storage device recharging power, with the providing of the at least one of the load power and the first energy storage device recharging power being based on the comparison of the load voltage requirement to a nominal DC link voltage value.

7. The drive system of claim 1 wherein the switch comprises one of a contactor-type mechanical switch and an electrical switch, with the switch controlling current flow in one direction or in both directions therethrough.

8. The drive system of claim 1 wherein the first energy storage device comprises a battery.

9. An energy system for providing power to a load, the energy system comprising:
   an energy storage system electrically coupleable to the load through a DC link, the energy storage system comprising:
   a first energy storage device; and
   a second energy storage device arranged in series with the first energy storage device, the second energy storage device being coupled to the DC link;

a bi-directional DC-DC converter electrically coupled to the DC link and to the energy storage system, with the bi-directional DC-DC converter connecting the first energy storage device to the DC link such that power to and from the first energy storage device is selectively routed through the bi-directional DC-DC converter and with the bi-directional DC-DC converter positioned such that power to and from the second energy storage device bypasses the DC-DC converter;

a switch positioned between the second energy storage device and the DC link, the switch being operable in a closed position and an open position to selectively connect and disconnect the second energy storage device to and from the DC link, respectively; and a controller configured to control operation of the bi-directional DC-DC converter and the switch based on power requirements of the load and based on voltage levels of the first and second energy storage devices.

10. The energy system of claim 9 wherein the bi-directional DC-DC converter is connected to a node located between the first energy storage device and the second energy storage device and to a node connecting the second energy storage device to the DC link.

11. The energy system of claim 9 wherein the first energy storage device is positioned on a low voltage side of the energy system and the second energy storage device is positioned on a high voltage side of the energy system, with the bi-directional DC-DC converter boosting voltage from the first energy storage device for providing to the DC link and with the second energy storage device being selectively coupled directly to the DC link via the switch.

12. The energy system of claim 9 wherein the switch comprises one of a contactor-type mechanical switch and an electrical switch, with the switch controlling current flow in one direction or in both directions therethrough.

13. A drive system comprising:
a load;
a direct current (DC) link electrically coupled to the load;
an energy storage system comprising a first energy storage device and a second energy storage device;
a bi-directional DC-DC converter positioned such that the first energy storage device is connected to the DC link through the bi-directional DC-DC converter and the second energy storage device is coupled to the DC link;
a switch positioned between the second energy storage device and the DC link, the switch being operable in a closed position and an open position to selectively connect and disconnect the second energy storage device to and from the DC link, respectively; and a controller configured to control operation of the DC-DC converter and the switch based on power requirements of the load and based on voltage levels of the first energy storage device and the second energy storage device.

14. The drive system of claim 13 further comprising a DC link capacitor coupled to the DC link, and wherein the first and second energy storage devices of the second energy storage system comprise a battery and an ultracapacitor, respectively.

15. The drive system of claim 14 wherein the controller is configured to maintain the ultracapacitor at a nominal voltage level that is between a demand charge threshold of the ultracapacitor comprising a minimum amount of stored energy for providing transient power from the ultracapacitor and a demand discharge threshold of the ultracapacitor comprising a highest stored energy of the ultracapacitor that allows for energy absorbing, wherein maintaining the ultracapacitor at the nominal voltage level comprises:
   causing the ultracapacitor to discharge when a voltage thereof is higher than the demand discharge threshold, so as to bring the voltage of the ultracapacitor down to the nominal voltage level; and
   causing the ultracapacitor to be charged when a voltage thereof is lower than the demand charge threshold, so as to so as to bring the voltage of the ultracapacitor up to the nominal voltage level.

16. The drive system of claim 15 wherein the controller is configured to:
   determine a load voltage requirement of the load;
   compare the load voltage requirement to a nominal DC link voltage value, the nominal DC link voltage value equivalent to a sum of the ultracapacitor nominal voltage level and a nominal voltage value of the battery;
   cause the switch to operate in the open position if the load voltage requirement is less than the nominal DC link voltage value; and
   cause the switch to operate in the closed position if the load voltage requirement is greater than the nominal DC link voltage value.

17. The drive system of claim 15 wherein, when the voltage of the ultracapacitor is higher than the demand discharge threshold, the controller causes the ultracapacitor to discharge to provide at least one of a load power and a battery recharging power, with the providing of the at least one of the load power and the battery recharging power being based on the comparison of the load voltage requirement to a nominal DC link voltage value.

* * * * *